United States Patent
Taniguchi et al.

(10) Patent No.: US 9,143,014 B2
(45) Date of Patent: Sep. 22, 2015

(54) ROTOR, DYNAMO-ELECTRIC MACHINE HAVING THE ROTOR AND ROTOR MANUFACTURING METHOD

(71) Applicants: DENSO CORPORATION, Kariya, Aichi-pref. (JP); ASMO CO., LTD., Kosai, Shizuoka-pref. (JP)

(72) Inventors: Makoto Taniguchi, Obu (JP); Jirou Hayashi, Ama (JP); Masahiro Goto, Kosai (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 281 days.

(21) Appl. No.: 13/913,812

(22) Filed: Jun. 10, 2013

(65) Prior Publication Data
US 2013/0342066 A1    Dec. 26, 2013

(30) Foreign Application Priority Data
Jun. 20, 2012    (JP) .................................. 2012-138608

(51) Int. Cl.
H02K 21/12    (2006.01)
H02K 1/28    (2006.01)
H02K 15/03    (2006.01)
H02K 1/27    (2006.01)

(52) U.S. Cl.
CPC ................. *H02K 1/28* (2013.01); *H02K 1/278* (2013.01); *H02K 15/03* (2013.01); *H02K 2213/03* (2013.01); *Y10T 29/49012* (2015.01)

(58) Field of Classification Search
CPC .......... H02K 1/28; H02K 1/278; H02K 15/03
USPC .............. 310/156.12, 156.13, 156.28; 29/596
See application file for complete search history.

(56) References Cited

U.S. PATENT DOCUMENTS

| | | | |
|---|---|---|---|
| 7,687,957 B2 * | 3/2010 | Ochiai et al. | 310/156.08 |
| 2009/0102304 A1 * | 4/2009 | Yamamura et al. | 310/156.28 |
| 2010/0133939 A1 | 6/2010 | Takemoto et al. | |
| 2010/0244607 A1 * | 9/2010 | Fujimoto et al. | 310/156.21 |
| 2010/0301695 A1 | 12/2010 | Yamada et al. | |
| 2013/0049511 A1 * | 2/2013 | Nishimura | 310/156.28 |
| 2014/0265706 A1 | 9/2014 | Yamada et al. | |

FOREIGN PATENT DOCUMENTS

| | | |
|---|---|---|
| JP | 2009-95200 | 4/2009 |
| JP | 2012-85445 | 4/2012 |

OTHER PUBLICATIONS

Office Action (3 pages) dated Jun. 30, 2015, issued in corresponding Japanese Application No. 2012-138608 and English translation (6 pages).

* cited by examiner

*Primary Examiner* — Hanh Nguyen
(74) *Attorney, Agent, or Firm* — Nixon & Vanderhye PC

(57) ABSTRACT

A cover is configured into a tubular form and is fitted to a radially outer surface of each of projections of a rotor core and a radially outer surface of each of permanent magnets. A circumferential center portion of the radially outer surface of each projection contacts a radially inner surface of the cover. Circumferential end portions of the radially outer surface of each projection are radially inwardly spaced from the radially inner surface of the cover.

14 Claims, 8 Drawing Sheets

ROTOR, DYNAMO-ELECTRIC MACHINE HAVING THE ROTOR AND ROTOR MANUFACTURING METHOD

CROSS REFERENCE TO RELATED APPLICATION

This application is based on and incorporates herein by reference Japanese Patent Application No. 2012-138608 filed on Jun. 20, 2012.

TECHNICAL FIELD

The present disclosure relates to a rotor, a dynamo-electric machine having the rotor and a rotor manufacturing method.

BACKGROUND

For example, permanent magnets, such as rare-earth magnets, have a high energy density and are often required to reduce a size of an electric motor. However, geological locations of the sources of rare-earth metals are limited. Therefore, it is desirable to minimize the amount of use of the permanent magnets. JP2010-259304A (corresponding to US2010/0133939A1) teaches a rotor that has a consequent-pole structure in an axial intermediate portion of a rotor core of the rotor to limit or reduce the amount of permanent magnets. Specifically, in the consequent-pole structure of this rotor, a plurality of projections radially outwardly projects from a boss of the rotor core, and each of the permanent magnets is circumferentially held between corresponding adjacent two of the projections. The permanent magnets are held by a cylindrical tubular cover, which is fitted to a radially outer surface of the rotor core, so that radially outward displacement of the permanent magnets caused by a centrifugal force of the rotating rotor core can be limited.

In the rotor of JP2010-259304A (corresponding to US2010/0133939A1), a radius of curvature of a radially outer surface of each permanent magnet and a center of curvature of the radially outer surface of each permanent magnet are designed to coincide with a radius of curvature of a radially outer surface of each projection and a center of curvature of the radially outer surface of each projection, respectively. Therefore, depending on a manufacturing accuracy, the following situation may possibly occur. Specifically, in a case where the manufacturing accuracy is reduced, i.e., is deteriorated, although the radially outer surface of each of the projections can entirely contact the cover, the contact between the permanent magnets and the cover may possibly become insufficient due to the reduced manufacturing accuracy. Therefore, in such a case, the sufficient holding force for holding the permanent magnets with the cover cannot be achieved. Furthermore, due to the small contact surface area between each permanent magnet and the cover, the compression stress, which is exerted on the permanent magnet, may possibly become large to cause a damage of the permanent magnet.

Furthermore, in the case where the radially outer surface of each of the projections entirely contacts the cover, a frictional resistance, which is exerted at the time of press-fitting the cover to the projections and the permanent magnets, may possibly become large to cause application of an excessive press-fitting load. Particularly, in a case where the rotor core is a laminated core, which includes a plurality of steel plates that are stacked one after another, the radially outer surface of each projection of the rotor core, which contacts the radially inner surface of the cover, is formed as a press-cut surface that is cut with a press machine. Therefore, in such a case, the frictional resistance at the time of press-fitting the cover to the rotor core may not be uniform due to influences of burrs and/or shear droop at the press-cut surface. Thereby, in such a case, the press-fitting load is further excessively increased. Therefore, in the case where the press-fitting load becomes excessive, the size of the press-fitting apparatus needs to be increased. Thus, the manufacturing costs may be increased. Also, buckling of the cover may possibly occur during the press-fitting process of the cover.

SUMMARY

The present disclosure is made in view of the above disadvantages. Thus, it is an objective of the present disclosure to provide a rotor, which can implement a sufficient holding force of a cover for holding permanent magnets and can limit a damage of the permanent magnets and can reduce a press-fitting load of the cover at the time of fitting the cover to the permanent magnets and the projections. It is another objective of the present disclosure to provide a dynamo-electric machine having such a rotor. It is another objective of the present disclosure to provide a rotor manufacturing method of such a rotor.

According to the present disclosure, there is provided a rotor that includes a rotatable shaft, a rotor core, a plurality of permanent magnets and a cover. The rotatable shaft is rotatable about a rotational axis of the rotatable shaft. The rotor core includes a boss and a plurality of projections. The boss is fixed to the rotatable shaft. The projections radially outwardly project from the boss and are spaced from each other in a circumferential direction. Each of the plurality of projections is formed as a soft magnetic pole and has a radially outer surface, which includes a circumferential center portion that is located radially outward of at least one of two circumferential end portions of the radially outer surface of the projection. Each of the plurality of permanent magnets is formed as a magnet pole and is circumferentially placed between corresponding adjacent two of the plurality of projections. Each of the plurality of permanent magnets has a radially outer surface that is an arcuate surface, which extends arcuately in the circumferential direction. The cover is configured into a tubular form and is fitted to the radially outer surface of each of the plurality of projections and the radially outer surface of each of the plurality of permanent magnets. The circumferential center portion of the radially outer surface of each of the plurality of projections contacts a radially inner surface of the cover. The at least one of the two circumferential end portions of the radially outer surface of each of the plurality of projections is radially inwardly spaced from the radially inner surface of the cover.

According to the present disclosure, there is also provided a dynamo-electric machine, which includes the above rotor and a stator. The stator is placed radially outward of the rotor and is configured to generate a magnetic field that is rotatable about the rotational axis of the rotatable shaft.

According to the present disclosure, there is also provided a rotor manufacturing method. According to the rotor manufacturing method, a rotor core is formed. The rotor core includes a boss and a plurality of projections. The boss is configured to be fixed to a rotatable shaft. The projections radially outwardly project from the boss and are spaced from each other in a circumferential direction. Each of the plurality of projections is formed as a soft magnetic pole and has a radially outer surface, which includes a circumferential center portion that is located radially outward of at least one of two circumferential end portions of the radially outer surface of the projection. Then, a plurality of permanent magnets is installed to the rotor core such that each of the plurality of permanent magnets is formed as a magnet pole and is circumferentially placed between corresponding adjacent two of the plurality of projections. Each of the plurality of permanent magnets has a radially outer surface that is an arcuate surface, which extends arcuately in the circumferential direction. Thereafter, a cover, which is configured into a tubular form, is fitted to the radially outer surface of each of the plurality of projections and the radially outer surface of each of the plurality of permanent magnets such that the circumferential center portion of the radially outer surface of each of the plurality of projections contacts a radially inner surface of the cover, and the at least one of the two circumferential end portions of the radially outer surface of each of the plurality of projections is radially inwardly spaced from the radially inner surface of the cover.

BRIEF DESCRIPTION OF THE DRAWINGS

The drawings described herein are for illustration purposes only and are not intended to limit the scope of the present disclosure in any way.

DETAILED DESCRIPTION

Figure 1:
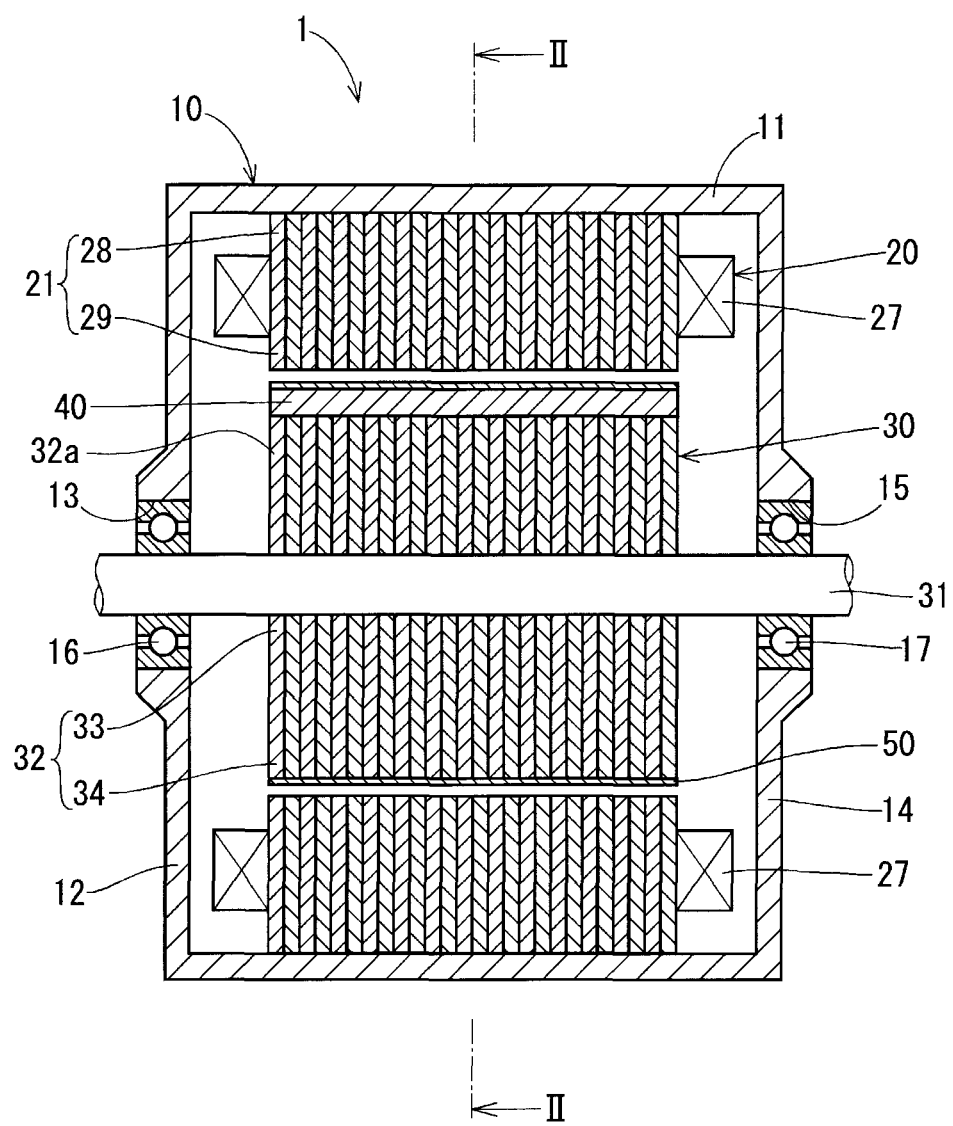
FIG. 1 is a schematic cross-sectional view showing an electric motor having a rotor according to a first embodiment of the present disclosure.

Various embodiments of the present disclosure will be described with reference to the accompanying drawings. In the following discussion of the embodiments, similar components will be indicated with the same reference numerals and will not be described redundantly for the sake of simplicity.

(First Embodiment)

Figure 2:
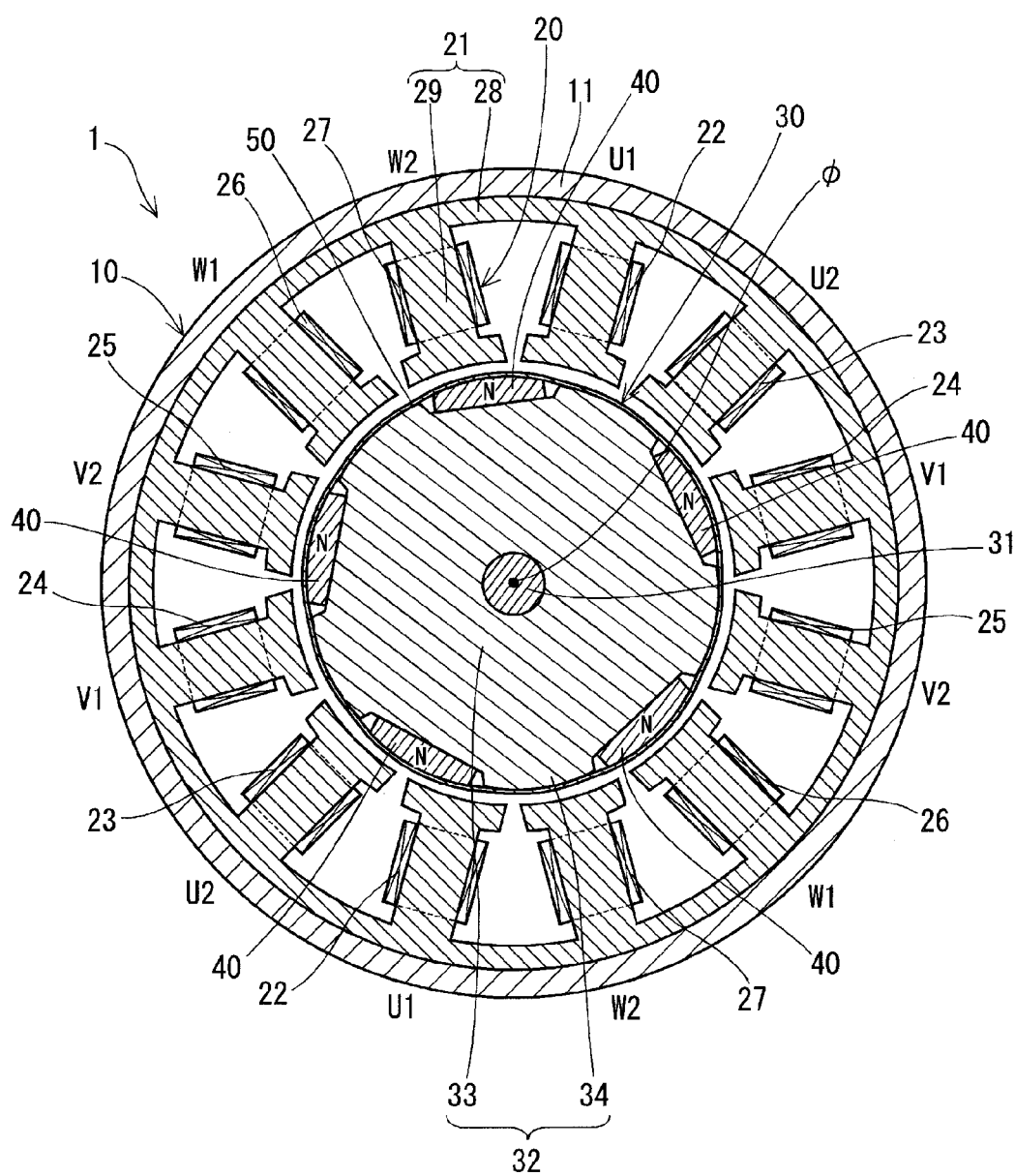
FIG. 2 is a cross-sectional view taken along line II-II in FIG. 1.

A rotor of a first embodiment of the present disclosure is applied to an electric motor shown in FIGS. 1 and 2. The electric motor 1, which serves as a dynamo-electric machine of the present disclosure, is a three-phase brushless motor and includes a case 10, a stator 20 and the rotor 30. In general, the dynamo-electric machine is defined as an apparatus for converting mechanical energy into electrical energy or vice versa. Therefore, although the dynamo-electric machine of the present disclosure is implemented as the electric motor in this embodiment, the dynamo-electric machine of the present disclosure may be implemented as any one of the electric motor, a generator and a motor-generator.

The case 10 includes a tubular portion 11, a first side portion 12 and a second side portion 14. The first side portion 12 closes one end of the tubular portion 11, and the second side portion 14 closes the other end of the tubular portion 11. A bearing 16 is installed in a through-hole 13, which extends through a center part of the first side portion 12, and a bearing 17 is installed in a through-hole 15, which extends through a center part of the second side portion 14.

The stator 20 includes a stator core 21 and a plurality of coils 22-27. The stator core 21 is placed radially inward of the tubular portion 11 of the case 10. The coils 22-27 are wound around the stator core 21.

The stator core 21 is integrally formed and includes a ring portion 28 and a plurality of teeth 29. The ring portion 28 is fixed to a radially inner surface (also referred to as an inner peripheral surface) of the tubular portion 11 of the case 10 by press-fitting. The teeth 29 radially inwardly project from the ring portion 28. In the present embodiment, the number of the teeth 29 is twelve, and these teeth 29 are arranged one after another at 30 degree intervals in a circumferential direction.

Each of the coils 22-27 is made of a conductive wire, which is wound around each corresponding tooth 29 of the stator core 21. Specifically, two coil groups are symmetrically arranged about a rotational axis φ of a rotatable shaft 31. Each coil group includes a U1-coil 22, a U2-coil 23, a V1-coil 24, a V2-coil 25, a W1-coil 26 and a W2-coil 27, which are arranged one after another in this order in a clockwise direction.

The rotor 30 is a consequent-pole rotor and includes the rotatable shaft 31, a rotor core 32, permanent magnets 40 and a cover 50.

The rotatable shaft 31 is rotatably supported by the bearing 16 and the bearing 17 to enable the rotation of the rotatable shaft 31 about the rotational axis φ.

The rotor core 32 is made of a soft magnetic material and includes a boss 33 and a plurality of projections 34. Each of the projections 34 is formed as a soft magnetic pole. The boss 33 is fixed to the rotatable shaft 31 by, for example, press-fitting. The projections 34 radially outwardly project from the boss 33. Furthermore, the projections 34 are spaced from each other and are arranged one after another in the circumferential direction. In the present embodiment, the rotor core 32 of the rotor 30 is formed as a laminated core that includes a plurality of steel plates 32a, which are stacked one after another in a direction (axial direction) of the rotational axis φ of the rotatable shaft 31.

Each of the permanent magnets 40 is formed as a magnet pole (magnetic pole) and is circumferentially placed between corresponding adjacent two of the projections 34. The boss 33 of the rotor core 32 functions as a yoke, which conducts a magnetic flux generated from the permanent magnets 40.

The cover 50 is a tubular member that has a thin wall and is fitted to the projections 34 and the permanent magnets 40. The cover 50 is fixed to the rotor core 32 by press-fitting. In the present embodiment, the cover 50 is made of a non-magnetic material, such as austenitic stainless steel. An example of the austenitic stainless steel may include SUS 304, which is defined according to the Japanese Industrial standard (JIS).

In the motor 1 constructed in the above-described manner, the coils 22-27 are connected to an electric power converting apparatus that includes an inverter, a control device and a battery. The energization of the U1-coil 22, the energization of the V1-coil 24 and the energization of the W1-coil 26 are sequentially changed, and the energization of the U2-coil 23, the energization of the V2-coil 25 and the energization of the W2-coil 27 are sequentially changed. Thereby, the rotating magnetic field, which is rotated in the circumferential direction, is generated. The rotor 30 is rotated in response to this rotating magnetic field.

Next, the characteristic feature of the present embodiment, i.e., the structure of the rotor 30 will be described in detail with reference to FIGS. 2 to 7.

In an imaginary plane, which is a plane of each of FIGS. 2 to 5 and is perpendicular to the rotational axis φ, each projection 34 of the rotor core 32 has a radially outer surface (also referred to as an outer peripheral surface) 35 that is located at a radially outer end of the projection 34 and is configured as an arcuate surface, which extends arcuately in the circumferential direction. In the radially outer surface 35, a circumferential center portion 37 is located on a radially outer side of two circumferential end portions 38, which are circumferentially opposed to each other. In the imaginary plane, which is perpendicular to the rotational axis φ, each permanent magnet 40 has a radially outer surface (also referred to as an outer peripheral surface) 41 that is located at a radially outer end of the permanent magnet 40 and is configured as an arcuate surface, which extends arcuately in the circumferential direction.

In the projection 34, the circumferential center portion 37 of the radially outer surface 35 contacts a radially inner surface (also referred to as an inner peripheral surface) 51 of the cover 50, and the circumferential end portions 38 of the radially outer surface 35 are radially inwardly spaced from the radially inner surface 51 of the cover 50. Specifically, a radius of curvature r1 of the radially outer surface 35 of the projection 34 is smaller than a radius of curvature r2 of the radially outer surface 41 of the permanent magnet 40. A center of curvature a1 of the radially outer surface 35 of the projection 34 is further spaced from the rotational axis φ in comparison to a center of curvature a2 of the radially outer surface 41 of the permanent magnet 40. In other words, a radial distance between the center of curvature a1 of the radially outer surface 35 of each projection 34 and the rotational axis φ of the rotatable shaft 31 is larger than a radial distance between the center of curvature a2 of the radially outer surface 41 of each permanent magnet 40 and the rotational axis φ of the rotatable shaft 31. Thereby, the center of curvature a1 of the radially outer surface 35 of the projection 34 is placed on a radially outer side of the center of curvature a2 of the radially outer surface 41 of the permanent magnet 40. Furthermore, a distance (also referred to as a first distance) D1, which is measured from any one of two opposed circumferential ends 36 of the radially outer surface 35 of each projection 34 to the rotational axis φ, is smaller than a distance (also referred to as a second distance) D2, which is measured from any one of two opposed circumferential ends 42 of the radially outer surface 41 of each permanent magnet 40 to the rotational axis φ. In each projection 34, the circumferential center portion 37 of the radially outer surface 35 is located radially outward of an imaginary straight line, which connects between the two circumferential ends 42 of the radially outer surface 35.

Figure 6:
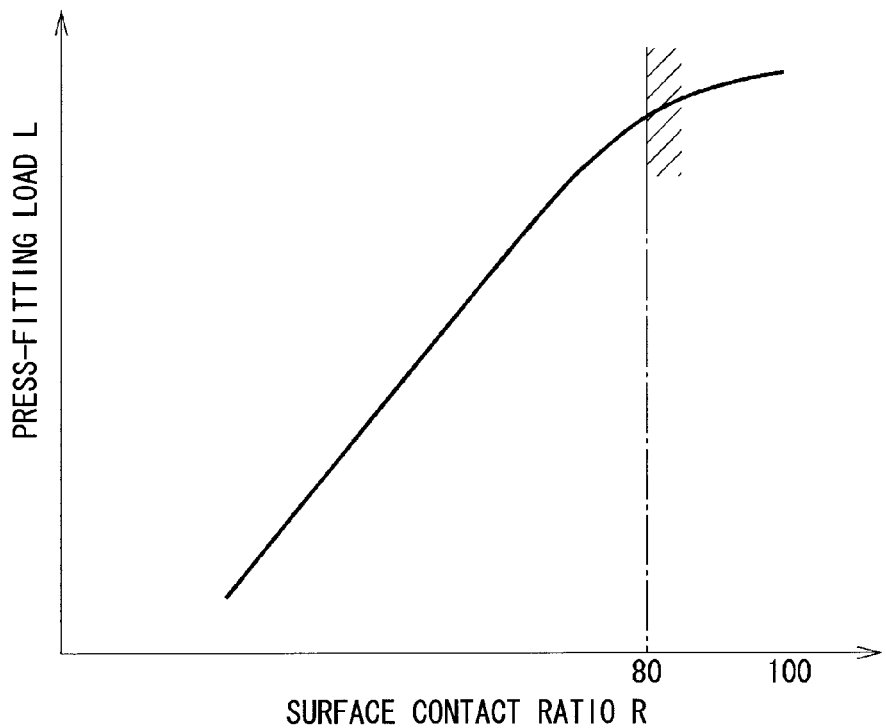
FIG. 6 is a diagram showing a relationship between a surface contact ratio and a press-fitting load obtained through experiments.

Hereinafter, a ratio of a surface area of a contacting portion (the circumferential center portion 37) of the radially outer surface 35 of the projection 34, which contacts the cover 50, relative to a total surface area of the radially outer surface 35 of the projection 34, will be referred to as a surface contact ratio R. Furthermore, a load, which is applied to the cover 50 at the time of press-fitting the cover 50 to the permanent magnets 40 and the projections 34, will be referred to as a press-fitting load L. A relationship between the surface contact ratio R and the press-fitting load L obtained through experiments is shown in FIG. 6. As indicated in FIG. 6, a ratio of a reduction of the press-fitting load L relative to a reduction of the surface contact ratio R becomes large when the surface contact ratio R is equal to or less than 80%.

Figure 7:
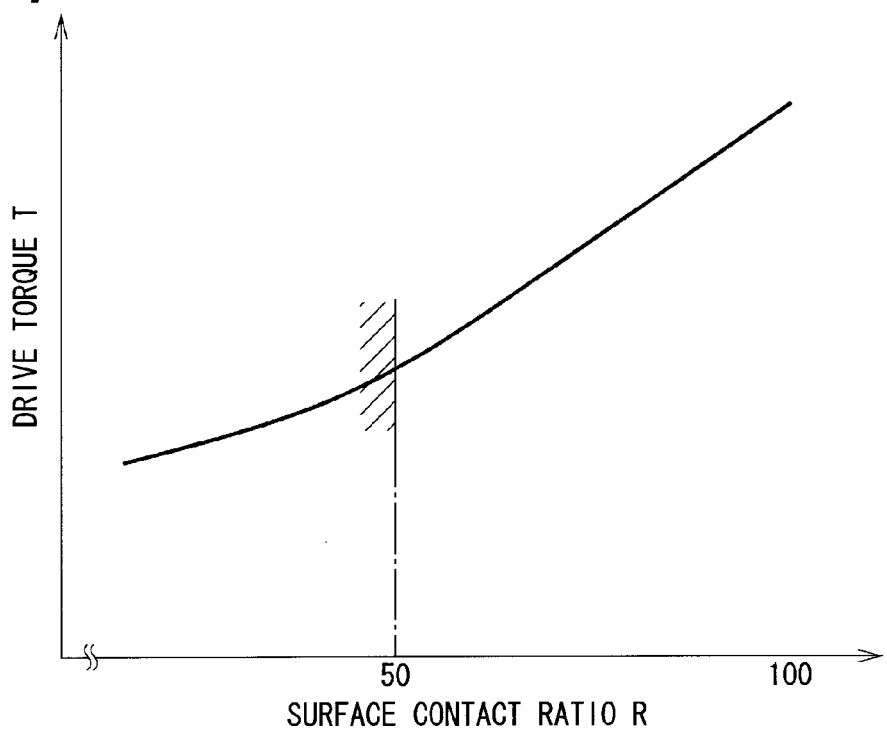
FIG. 7 is a diagram showing a relationship between the surface contact ratio and a drive torque obtained through experiments.

Furthermore, a torque, which is exerted in the rotor 30 at the time of driving the motor 1, will be referred to as a drive torque T. A relationship between the surface contact ratio R and the drive torque T obtained through experiments is shown in FIG. 7. As indicated in FIG. 7, a ratio of an increase of the drive torque T relative to an increase of the surface contact ratio R becomes large when the surface contact ratio R is equal to or larger than 50%.

In the present embodiment, in view of the above relationships, the projections 34 of the rotor core 32 are formed such that the surface contact ratio R of each projection 34 of the rotor core 32 is, for example, 65% (or about 65%).

Figure 3:
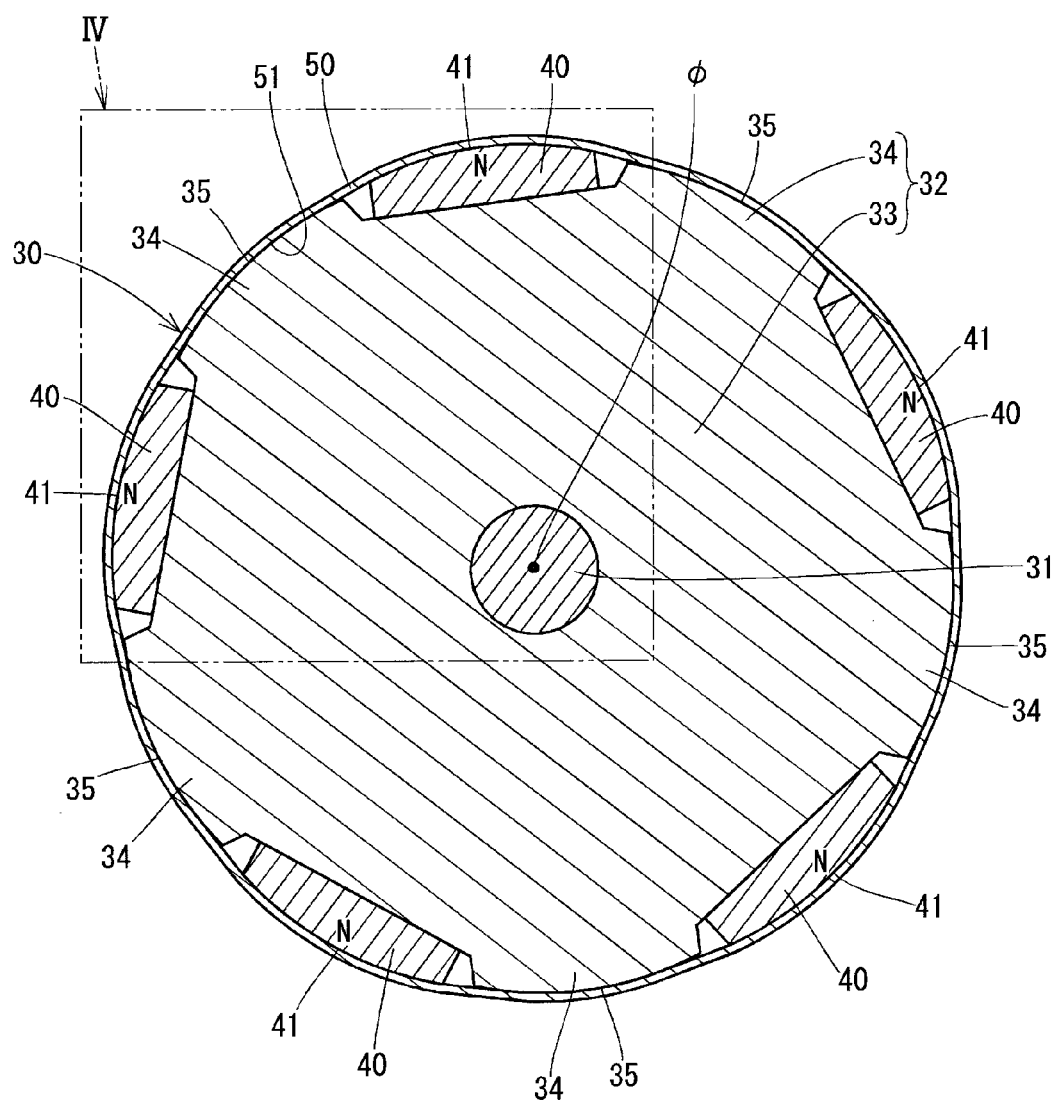
FIG. 3 is an enlarged cross-sectional view of the rotor shown in FIG. 2.
Figure 4:
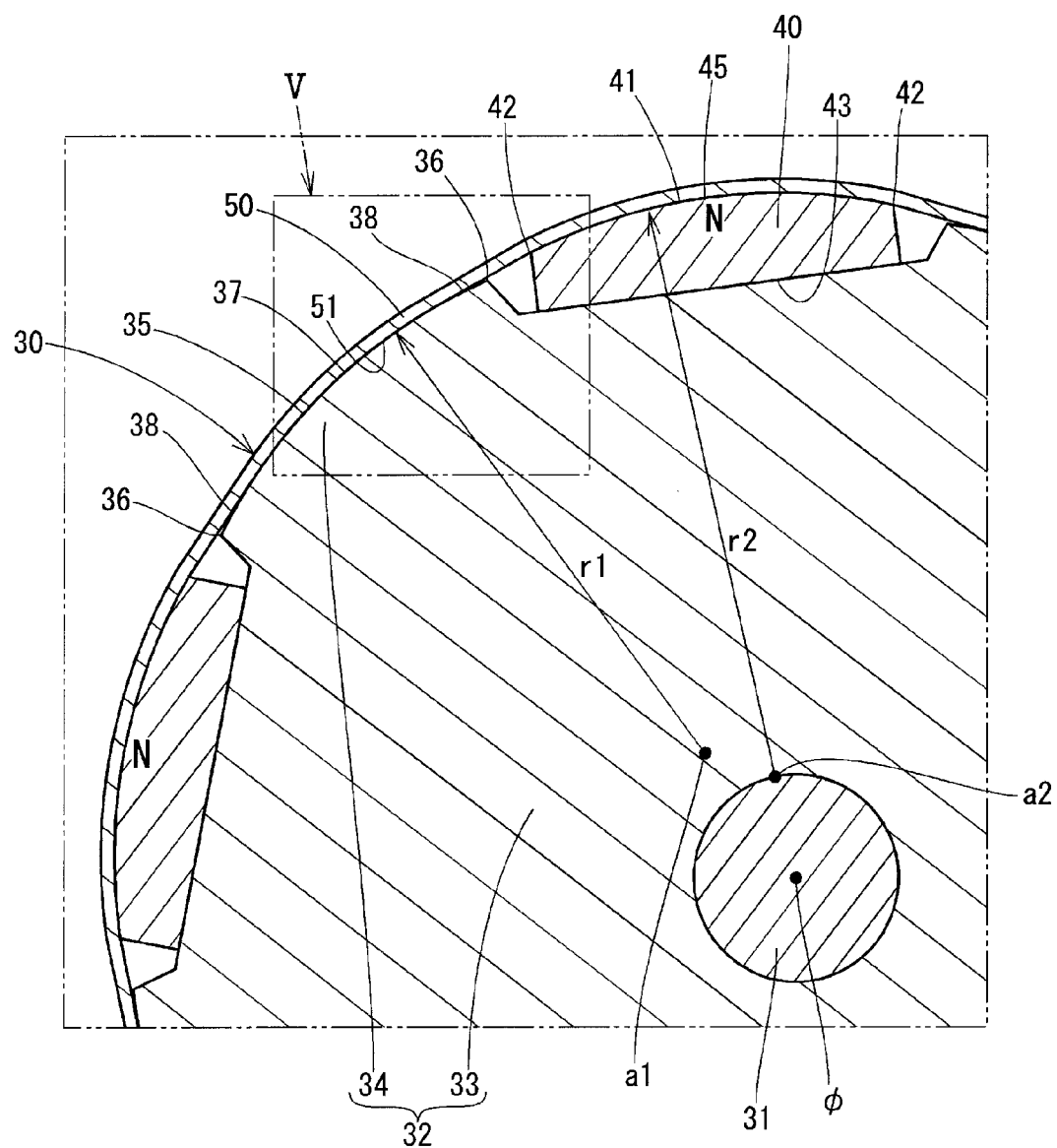
FIG. 4 is a partial enlarged view of an area IV shown in FIG. 3.
Figure 5:
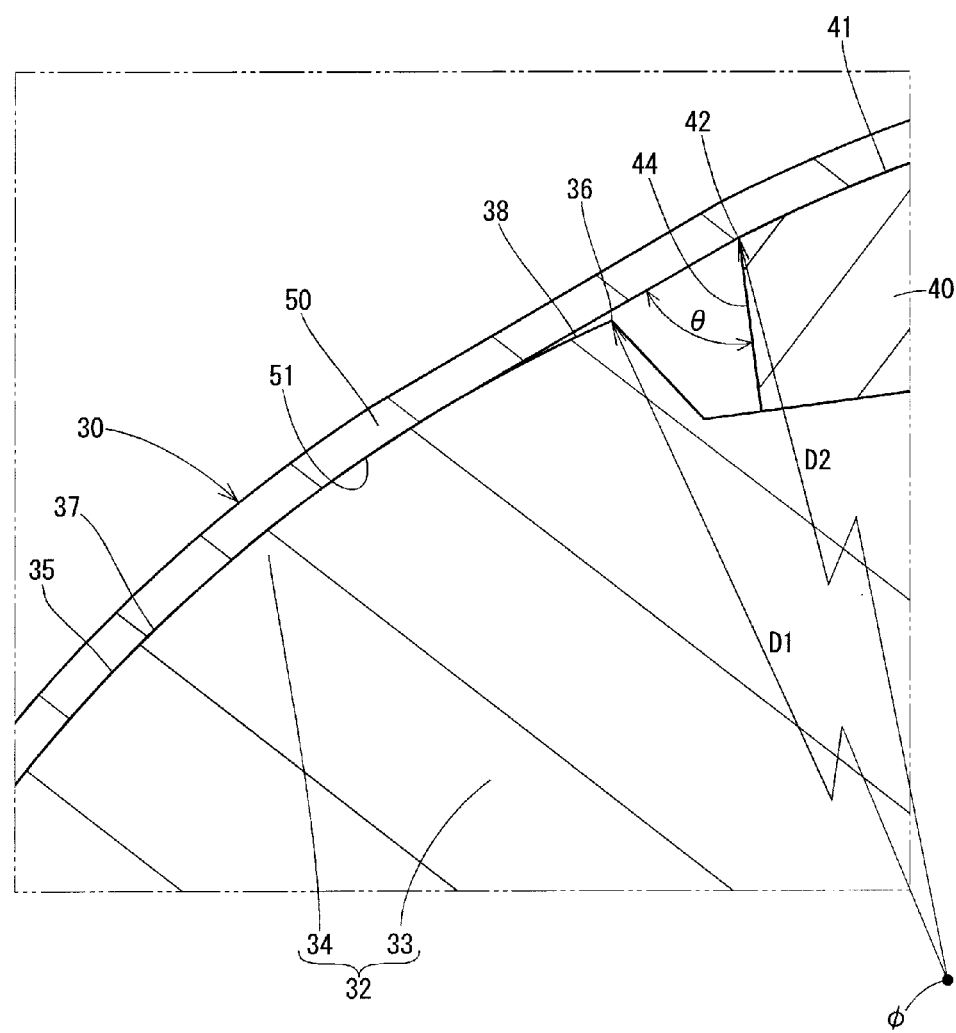
FIG. 5 is a partial enlarged view of an area V shown in FIG. 4.

A radially inner surface (also referred to as an inner peripheral surface) 43 of each permanent magnet 40, which is radially opposite from the radially outer surface 41, is a planar surface that is generally perpendicular to the radial direction of the rotatable shaft 31. A radial thickness of the permanent magnet 40 is progressively reduced from a circumferential center portion 45 to each of the circumferential ends 42. Furthermore, a circumferential extent (circumferential width) of the permanent magnet 40 is generally the same as a circumferential extent (circumferential width) of each of the projections 34. Furthermore, the permanent magnets 40 are arranged such that the same polarity (the N-pole) is placed radially outward. In other words, the radially outer surfaces 41 of all of the permanent magnets 40 have the identical polarity (the N-pole). In FIGS. 2 to 4, "N" indicates that the magnetic pole of the permanent magnet 40, which is placed radially outward, is the N-pole. Furthermore, a wall thickness (a radial wall thickness) of the cover 50 is equal to or smaller than a wall thickness (a plate thickness) of each steel plate 32a of the rotor core 32, which is measured in a direction perpendicular to the plane of the steel plate 32a. A circumferential extent (circumferential width) of the contacting area (the contact boundary) between the radially inner surface 51 of the cover 50 and the radially outer surface 35 of each projection 34 is smaller than a circumferential extent (circumferential width) of the contacting area (the contact boundary) between the radially inner surface 51 of the cover 50 and the radially outer surface 41 of each permanent magnet 40.

As discussed above, in the rotor 30 of the first embodiment, the circumferential center portion 37 of the radially outer surface 35 of the projection 34 contacts the radially inner surface 51 of the cover 50, and the circumferential end portions 38 of the radially outer surface 35 of the projection 34 are radially inwardly spaced from the radially inner surface 51 of the cover 50.

Thereby, the radially outer surface 41 of each permanent magnet 40, which is placed adjacent to the corresponding circumferential end portion 38 of the radially outer surface 35 of the corresponding circumferentially adjacent projection 34, can reliably entirely contact the cover 50. Furthermore, since the circumferential end portions 38 of the radially outer surface 35 of each projection 34 are radially inwardly spaced from the cover 50, an angle θ (see FIG. 5), which is defined between a circumferential end surface 44 of the permanent magnet 40 and the cover 50 becomes small (see FIG. 5). Therefore, it is possible to increase an urging force of the cover 50, which radially inwardly urges the permanent magnet 40 toward the rotational axis φ. Therefore, a sufficient holding force of the cover 50, which is exerted to hold the respective permanent magnets 40, can be implemented.

Furthermore, it is possible to avoid an increase in a compressive stress exerted against each permanent magnet 40 caused by the localized contact between the permanent magnet 40 and the cover 50. Therefore, it is possible to limit a damage of the permanent magnet 40.

In addition, the circumferential end portions 38 of the radially outer surface 35 of the projection 34 are spaced from the cover 50. Therefore, a frictional resistance of the cover 50 relative to the rotor core 32 is reduced to enable a reduction in the press-fitting load L.

In the first embodiment, each of the projections 34 of the rotor core 32 is formed to implement the surface contact ratio R of 65% (or about 65%). When the surface contact ratio R is larger than 80%, the advantageous reducing effect for reducing the press-fitting load L is significantly diminished. Therefore, when the surface contact ratio R is set to 65% (or about 65%), the sufficient reducing effect for reducing the press-fitting load L can be achieved.

Furthermore, when the surface contact ratio R is reduced, the radially outer surface 35 of the projection 34 is further spaced from the radially inner surface of each corresponding tooth 29 of the stator 20 to possibly cause a reduction in the effective flux linkage. In view of this point, according to the first embodiment, the surface contact ratio R is set to 65% (or about 65%), which is equal to or larger than 50%. In this way, an increase in the gap between the stator 20 and the projection 34 is limited to limit a reduction in the drive torque T.

Here, it should be noted that a saturation flux density of the soft magnetic material is larger than a saturation flux density of a magnet material, and a magnetic resistance of the soft magnetic material is smaller than a magnetic resistance of the magnet material. Therefore, the reduction of the effective flux linkage, which is caused by the partial increase in the gap between the stator 20 and each corresponding projection 34 through the provision of the gap between the cover 50 and the projection 34, does not have a significant influence on the reduction of the drive torque T.

Furthermore, according to the first embodiment, in the imaginary plane, which is perpendicular to the rotational axis φ, the radially outer surface 35 of the projection 34 is configured into the arcuate surface. With this configuration of the projection 34, it is possible to contact the circumferential center portion 37 of the radially outer surface 35 of the projection 34 against the radially inner surface 51 of the cover 50 and to radially inwardly space the circumferential end portions 38 of the radially outer surface 35 of the projection 34 away from the radially inner surface 51 of the cover 50.

Furthermore, in the first embodiment, the radius of curvature r1 of the radially outer surface 35 of the projection 34 is smaller than the radius of curvature r2 of the radially outer surface 41 of the permanent magnet 40, and the center of curvature a1 of the radially outer surface 35 of the projection 34 is further spaced from the rotational axis φ in comparison to the center of curvature a2 of the radially outer surface of the permanent magnet 40.

Therefore, the gap between the radially outer surface of each magnetic pole and the radially inner surface of the tooth 29 of the stator 20 can be generally equally set in the circumferential direction. Thus, it is possible to limit the reduction in the drive torque T.

In the first embodiment, the radially inner surface 43 of the permanent magnet 40, which is radially opposite from the radially outer surface 41, is the planar surface that is generally perpendicular to the radial direction of the rotatable shaft 31. The radial thickness of the permanent magnet 40 is progressively reduced from the circumferential center portion 45 to each circumferential end 42.

Therefore, each space, which is defined by the boss 33 and the cover 50, i.e., the receiving space of the permanent magnet 40 provides the wedging effect in the rotational direction. Thereby, the circumferential displacement of the permanent magnet 40 can be limited.

Furthermore, in the first embodiment, the circumferential extent (circumferential width) of each permanent magnet 40 is generally the same as the circumferential extent (circumferential width) of each projection 34. Furthermore, the permanent magnets 40 are arranged such that the same polarity is placed radially outward.

Thereby, the number of the permanent magnets 40 can be reduced.

Furthermore, according to the first embodiment, the rotor core 32 includes the steel plates 32a, which are stacked one after another in the direction of the rotational axis φ, and the wall thickness of the cover 50 is equal to or smaller than the wall thickness (plate thickness) of each of these steel plates 32a of the rotor core 32.

Thus, the cover 50 can be easily deformed along the radially outer surface of each magnetic pole, and thereby the press-fitting load L can be further reduced.

Furthermore, according to the first embodiment, the circumferential extent (circumferential width) of the contacting area (the contact boundary) between the radially inner surface 51 of the cover 50 and the radially outer surface 35 of each projection 34 is smaller than the circumferential extent (circumferential width) of the contacting area (the contact boundary) between the radially inner surface 51 of the cover 50 and the radially outer surface 41 of each permanent magnet 40.

Therefore, the press-fitting of the cover 50 is eased, and thereby the fixing of each permanent magnet 40 can be reliably made.

Furthermore, according to the first embodiment, the rotor 30 is applied to the motor 1. Therefore, it is possible to reduce both of the press-fitting load L of the cover 50 and the stress applied to the permanent magnets 40 while maintaining the sufficient holding force of the rotor 30 for holding the permanent magnets 40 and the basic characteristics of the motor 1.

(Second Embodiment)

Figure 8:
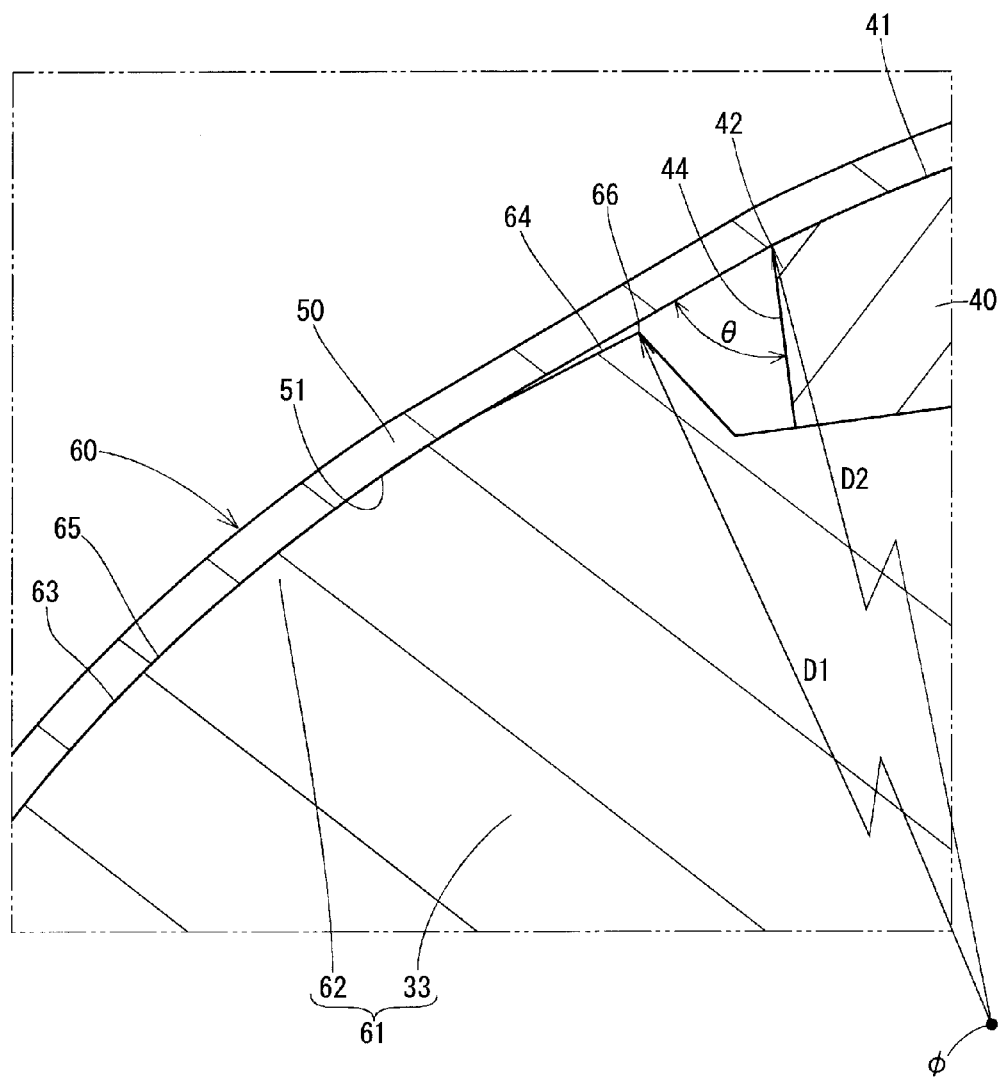
FIG. 8 is a partial enlarged view of a rotor according to a second embodiment of the present disclosure.

A rotor according to a second embodiment of the present disclosure will be described with reference to FIG. 8.

The rotor 60 of the second embodiment is similar to the rotor 30 of the first embodiment except a configuration of a radially outer surface 63 of each of projections 62 of a rotor core 61. Specifically, each of two circumferential end portions 64 of the radially outer surface 63 is radially inwardly sloped, i.e., is tilted from a circumferential center side, at which a circumferential center portion 65 is located, to a corresponding circumferential end 66 of the radially outer surface 63. Furthermore, the distance D1, which is measured from any one of the two opposed circumferential ends 66 of the radially outer surface 63 of the projection 62 to the rotational axis φ, is set to be smaller than the distance D2, which is measured from any one of the two opposed circumferential ends 42 of the radially outer surface 41 to the rotational axis φ. Furthermore, in each projection 62, the circumferential center portion 65 of the radially outer surface 63 is located radially outward of an imaginary straight line, which connects between the two circumferential ends 66 of the radially outer surface 63. With the above construction, the circumferential center portion 65 of the radially outer surface 63 of the projection 62 contacts the radially inner surface 51 of the cover 50, and each of the circumferential end portions 64 of the radially outer surface 63 is radially inwardly spaced from the radially inner surface 51 of the cover 50.

According to the second embodiment, the advantages, which are similar to those of the first embodiment, can be achieved.

(Third Embodiment)

Figure 9:
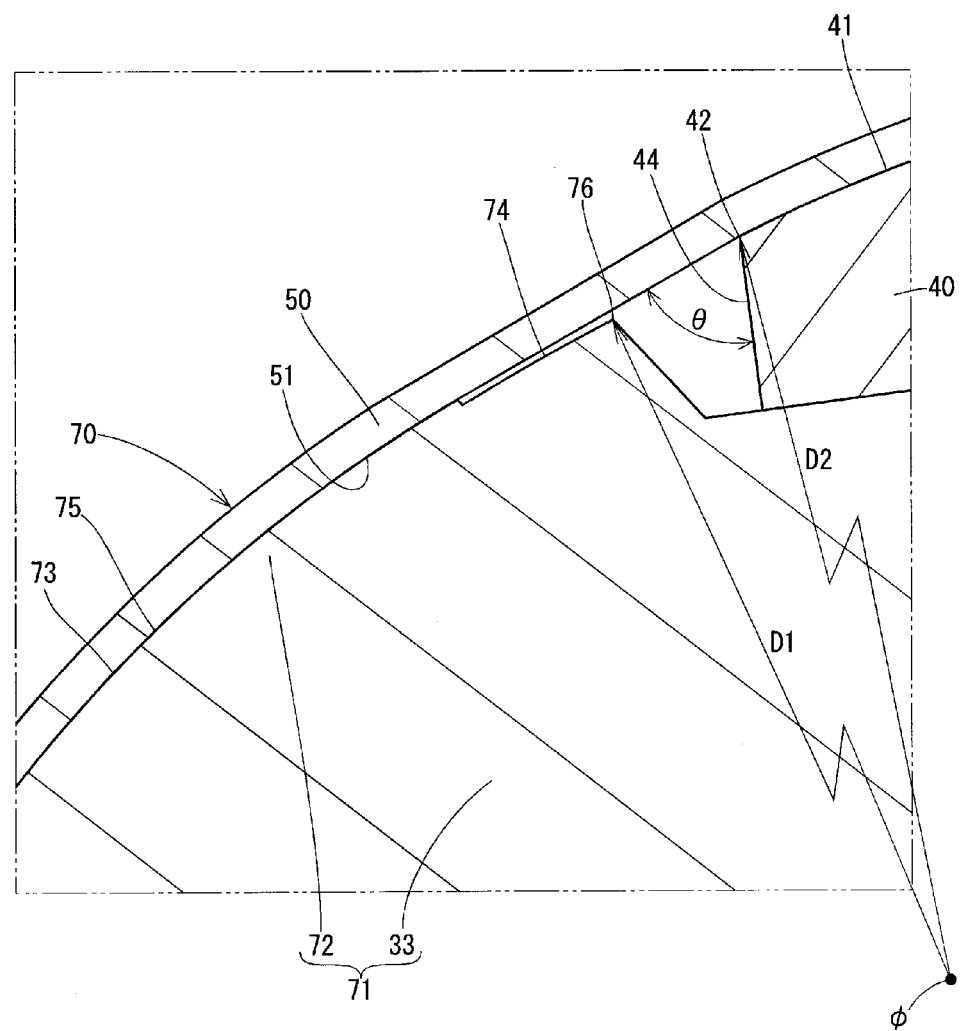
FIG. 9 is a partial enlarged view of a rotor according to a third embodiment of the present disclosure.

A rotor according to a third embodiment of the present disclosure will be described with reference to FIG. 9.

The rotor 70 of the third embodiment is similar to the rotor 30 of the first embodiment except a configuration of a radially outer surface 73 of each of projections 72 of a rotor core 71. Specifically, each of two circumferential end portions 74 of the radially outer surface 73 is radially inwardly recessed in a stepwise manner from a circumferential center side, at which a circumferential center portion 75 is located, to a corresponding circumferential end 76. Furthermore, the distance D1, which is measured from any one of the two opposed circumferential ends 76 of the radially outer surface 73 of the projection 72 to the rotational axis φ, is set to be smaller than the distance D2, which is measured from any one of the two opposed circumferential ends 42 of the radially outer surface 41 to the rotational axis φ. In each projection 72, the circumferential center portion 75 of the radially outer surface 73 is located radially outward of an imaginary straight line, which connects between the two circumferential ends 76 of the radially outer surface 73. With the above construction, the center portion 75 of the radially outer surface 73 of the projection 72 contacts the radially inner surface 51 of the cover 50, and each of the circumferential end portions 74 of the radially outer surface 73 is radially inwardly spaced from the radially inner surface 51 of the cover 50.

According to the third embodiment, the advantages, which are similar to those of the first embodiment, can be achieved.

Now, modifications of the above embodiments will be described.

In the above embodiments, the rotor core 32, 61, 71 is formed as the laminated core, which includes the steel plates stacked one after another. However, the rotor core of the present disclosure is not limited to the laminated core. For example, the rotor core may be formed by compression molding of magnetic powder.

The ratio of the surface area of the contacting portion of the radially outer surface of the projection, which contacts the cover, relative to the total surface area of the radially outer surface of the projection, may be other than 65%. When the ratio R of the surface area of the contacting portion of the radially outer surface of the projection, which contacts the cover, relative to the total surface area of the radially outer surface of the projection, is set to be in the range of 50% to 80% (i.e., $50\% \leq R \leq 80\%$), the advantageous reducing effect for reducing the press-fitting load of the cover 50 can be achieved, and the reduction of the drive torque can be advantageously limited.

The present disclosure can be applied to a rotor, which has a consequent pole structure in a portion (e.g., a middle portion) of an axial extent of the rotor.

In the above embodiments, the circumferential ends 42 of the permanent magnet 40 are not chamfered. Alternatively, the circumferential ends of each permanent magnet may be chambered. In such a case, the cover may not contact the chambered part of the permanent magnet.

The number of the magnetic poles of the rotor is not limited to ten. That is, the number of the magnetic poles may be other than ten (i.e., may be larger than ten or smaller than ten).

The number of the coils of the stator is not limited to twelve. That is, the number of the coils of the stator may be other than twelve (i.e., may be larger than twelve or smaller than twelve). Furthermore, the teeth of the stator may be formed by separate members.

The rotor of the present disclosure is not limited to the rotor of the motor. For instance, the rotor of the present disclosure may be applied to any other appropriate dynamo-electric machine (e.g., an electric generator).

The present disclosure is not limited the above embodiments and modifications thereof. That is, the above embodiments and modifications thereof may be modified in various ways without departing from the spirit and scope of the present disclosure.

What is claimed is:

1. A rotor comprising:
   a rotatable shaft that is rotatable about a rotational axis of the rotatable shaft;
   a rotor core that includes a boss, which is fixed to the rotatable shaft, and a plurality of projections, which radially outwardly project from the boss and are spaced from each other in a circumferential direction, wherein each of the plurality of projections is formed as a soft magnetic pole and has a radially outer surface, which includes a circumferential center portion that is located radially outward of at least one of two circumferential end portions of the radially outer surface of the projection;
   a plurality of permanent magnets, each of which is formed as a magnet pole and is circumferentially placed between corresponding adjacent two of the plurality of projections, wherein each of the plurality of permanent magnets has a radially outer surface that is an arcuate surface, which extends arcuately in the circumferential direction; and
   a cover that is configured into a tubular form and is fitted to the radially outer surface of each of the plurality of projections and the radially outer surface of each of the plurality of permanent magnets, wherein:
   the circumferential center portion of the radially outer surface of each of the plurality of projections contacts a radially inner surface of the cover; and
   the at least one of the two circumferential end portions of the radially outer surface of each of the plurality of projections is radially inwardly spaced from the radially inner surface of the cover.

2. The rotor according to claim 1, wherein a ratio of a surface area of a contacting portion of the radially outer surface of each of the plurality of projections, which contacts the cover, relative to a total surface area of the radially outer surface of the projection is in a range of 50% to 80%.

3. The rotor according to claim 1, wherein the radially outer surface of each of the plurality of projections is an arcuate surface that extends arcuately in the circumferential direction.

4. The rotor according to claim 3, wherein:
   a radius of curvature of the radially outer surface of each of the plurality of projections is smaller than a radius of curvature of the radially outer surface of each of the plurality of permanent magnets; and
   a center of curvature of the radially outer surface of each of the plurality of projections is further spaced from the rotational axis of the rotatable shaft in comparison to a center of curvature of the radially outer surface of each of the plurality of permanent magnets.

5. The rotor according to claim 1, wherein a radial wall thickness of each of the plurality of permanent magnets is progressively reduced from a circumferential center portion of the radially outer surface of the permanent magnet toward each of two circumferential ends of the radially outer surface of the permanent magnet.

6. The rotor according to claim 1, wherein a circumferential extent of each of the plurality of permanent magnets is equal to or larger than a circumferential extent of each of the plurality of projections.

7. The rotor according to claim 1, wherein the radially outer surfaces of all of the plurality of permanent magnets have an identical polarity.

8. The rotor according to claim 1, wherein:
the rotor core includes a plurality of steel plates, which are stacked one after another in a direction of the rotational axis of the rotatable shaft; and
a radial wall thickness of the cover is equal to or smaller than a plate thickness of each of the plurality of steel plates, which is measure in a direction perpendicular to a plane of the steel plate.

9. The rotor according to claim 1, wherein a circumferential extent of a contacting area between the radially outer surface of each of the plurality of projections and the radially inner surface of the cover is smaller than a circumferential extent of a contacting area between the radially outer surface of each of the plurality of permanent magnets and the radially inner surface of the cover.

10. A dynamo-electric machine comprising:
the rotor of claim 1; and
a stator that is placed radially outward of the rotor and is configured to generate a magnetic field that is rotatable about the rotational axis of the rotatable shaft.

11. A rotor manufacturing method, comprising:
forming a rotor core that includes a boss, which is configured to be fixed to a rotatable shaft, and a plurality of projections, which radially outwardly project from the boss and are spaced from each other in a circumferential direction, wherein each of the plurality of projections is formed as a soft magnetic pole and has a radially outer surface, which includes a circumferential center portion that is located radially outward of at least one of two circumferential end portions of the radially outer surface of the projection;
installing a plurality of permanent magnets to the rotor core such that each of the plurality of permanent magnets is formed as a magnet pole and is circumferentially placed between corresponding adjacent two of the plurality of projections, wherein each of the plurality of permanent magnets has a radially outer surface that is an arcuate surface, which extends arcuately in the circumferential direction; and
fitting a cover, which is configured into a tubular form, to the radially outer surface of each of the plurality of projections and the radially outer surface of each of the plurality of permanent magnets such that the circumferential center portion of the radially outer surface of each of the plurality of projections contacts a radially inner surface of the cover, and the at least one of the two circumferential end portions of the radially outer surface of each of the plurality of projections is radially inwardly spaced from the radially inner surface of the cover.

12. The rotor manufacturing method according to claim 11, wherein the forming of the rotor core includes forming each of the plurality of projections such that a ratio of a surface area of a contacting portion of the radially outer surface of each of the plurality of projections, which contacts the cover, relative to a total surface area of the radially outer surface of the projection is in a range of 50% to 80% after the fitting of the cover.

13. The rotor manufacturing method according to claim 11, wherein the forming of the rotor core includes forming the radially outer surface of each of the plurality of projections as an arcuate surface that extends arcuately in the circumferential direction.

14. The rotor manufacturing method according to claim 13, wherein the forming of the radially outer surface of each of the plurality of projections includes forming the radially outer surface of each of the plurality of projections such that a radius of curvature of the radially outer surface of each of the plurality of projections is smaller than a radius of curvature of the radially outer surface of each of the plurality of permanent magnets, and a radial distance between a center of curvature of the radially outer surface of each of the plurality of projections and the rotational axis of the rotatable shaft is larger than a radial distance between a center of curvature of the radially outer surface of each of the plurality of permanent magnets and the rotational axis of the rotatable shaft.

* * * * *